United States Patent [19]
Fini

[11] Patent Number: 5,188,801
[45] Date of Patent: Feb. 23, 1993

[54] DEVICE FOR THE TREATMENT OF BLOOD

[75] Inventor: Massimo Fini, Mirandola, Italy

[73] Assignee: Cortek S.p.A., Mirandola, Italy

[21] Appl. No.: 641,807

[22] Filed: Jan. 16, 1991

Related U.S. Application Data

[63] Continuation of Ser. No. 360,214, Jun. 2, 1989, abandoned.

[30] Foreign Application Priority Data

Jun. 7, 1988 [IT] Italy ................................ 20881 A/88

[51] Int. Cl.⁵ .............................................. A61M 1/14
[52] U.S. Cl. ...................................... 422/48; 422/46;
210/321.71; 210/321.81; 210/321.9; 128/DIG.
3; 261/DIG. 28; 55/16; 55/158
[58] Field of Search ............... 422/46, 48; 210/321.71,
210/321.81, 321.9; 128/DIG. 3; 261/DIG. 28;
55/16, 158

[56] References Cited

U.S. PATENT DOCUMENTS

| | | | |
|---|---|---|---|
| 3,422,008 | 1/1969 | McLain | 210/321.71 |
| 3,455,460 | 7/1989 | Mahon et al. | 210/321.88 |
| 3,536,611 | 10/1970 | De Filippi et al. | 210/321.71 |
| 3,794,468 | 2/1974 | Leonard | 210/321.71 |
| 3,934,982 | 1/1976 | Arp | 128/DIG. 3 |
| 4,031,012 | 6/1977 | Gics | 210/321 |
| 4,111,659 | 9/1978 | Bowley | 422/48 |
| 4,140,637 | 2/1979 | Walter | 210/321.79 |
| 4,187,180 | 2/1980 | Joh | 210/321 |
| 4,239,729 | 12/1980 | Hasegawa et al. | 422/48 |
| 4,242,203 | 12/1980 | Amicel et al. | 210/321.81 |
| 4,352,736 | 10/1982 | Ukai et al. | 210/321.71 |
| 4,368,124 | 1/1983 | Brumfield | 210/321.79 |
| 4,424,190 | 1/1984 | Mather, III et al. | 422/46 |
| 4,425,234 | 1/1984 | Reitz | 210/321.3 |
| 4,622,206 | 11/1986 | Torgeson | 422/48 |
| 4,818,490 | 4/1989 | Carson et al. | 422/46 |
| 4,911,846 | 3/1990 | Akasu et al. | 210/645 |

FOREIGN PATENT DOCUMENTS

024578A1 11/1987 European Pat. Off. .

Primary Examiner—Lynn M. Kummert
Attorney, Agent, or Firm—Thomas E. Popovich

[57] ABSTRACT

The invention relates to a blood-treatment device including hollow fibers which are suitable for conveying a fluid and are in a plurality of superposed layers arranged in directions which are offset from layer to layer so as to create a uniform flow of blood from an inlet chamber adjacent one end layer of the plurality of superposed layers to an outlet chamber adjacent the other end layer, the blood passing through the layers in a direction substantially perpendicular thereto and bathing the external surfaces of the hollow fibers.

10 Claims, 2 Drawing Sheets

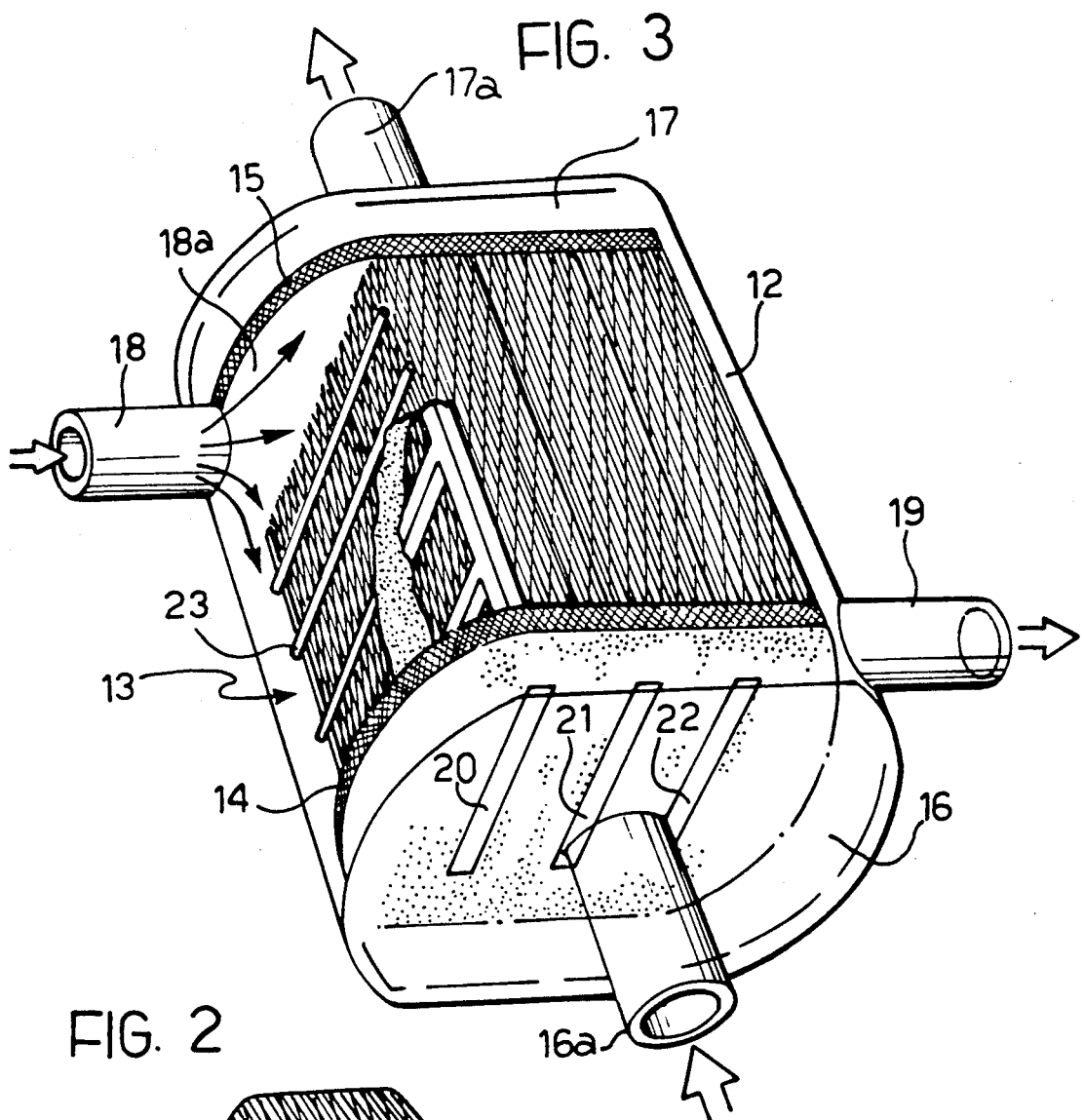

DEVICE FOR THE TREATMENT OF BLOOD

This application is a continuation of Ser. No. 07/360,214, filed Jun. 2, 1989, now abandoned.

The invention relates to a device for the treatment of blood.

It is known that extracorporal circuits through which blood flows during surgical operations have an oxygenator device which has the function of giving up oxygen to the blood and at the same time removing carbon dioxide, and a heat exchanger in which the temperature of the blood is regulated by the exchange of heat with a fluid, normally water.

Both the oxygenators and the heat exchangers of the prior art are produced in many forms, but none is without disadvantageous characteristics which the device according to the invention aims to eliminate.

In particular, the object of the present invention is to provide a device for the treatment of blood which, by the suitable selection of the hollow fibres which it contains, can act as an oxygenator or a heat exchanger through which the blood flows with a minimum loss of pressure, so as to enable circulation by gravity alone and optimal operating conditions, such as, for example, negligible haemolytic damage.

The object proposed is achieved by a blood-treatment device according to the invention, characterised in that it includes hollow fibres which are suitable for conveying a fluid and are in a plurality of superposed layers arranged in directions which are offset from layer to layer so as to create a uniform flow of blood from an inlet chamber adjacent one end layer of the plurality of superposed layers to an outlet chamber adjacent the other end layer, the blood passing through the layers in a direction substantially perpendicular thereto and bathing the external surfaces of the hollow fibres.

BRIEF DESCRIPTION OF THE DRAWINGS

Further characteristics and advantages will become clearer from the description of two preferred but not exclusive embodiments of the invention illustrated by way of non-limiting example in the appended drawings, in which:

FIG. 2 shows a detail of FIG. 1 on a reduced scale;

FIG. 3 shows a first variant of the invention.

With reference to FIGS. 1 and 2, a casing, indicated 1, houses a plurality of superposed layers of hollow fibres, generally indicated 2, the ends of the hollow fibres being incorporated in two walls 3 and 4 of resin or potting and opening into two opposed spaces 5 and 6 which have respective connections 5a and 6a for the inlet and outlet of the fluid which, as will be described in more detail below, is intended to be conveyed by the hollow fibres. The fibres in the various layers are arranged in offset directions, that is, the alternate layers are inclined at different angles to the longitudinal axis of the device on which the connections 5a and 6a and arranged, and this arrangement is achieved very simply, in known manner, by wrapping a pair of bands, indicated 8 and 9 in FIG. 2, several times around a frame 7 in contact with each other, the fibres being combined in the bands so as to be arranged in directions which are slightly offset from one band to another.

Figure 1:
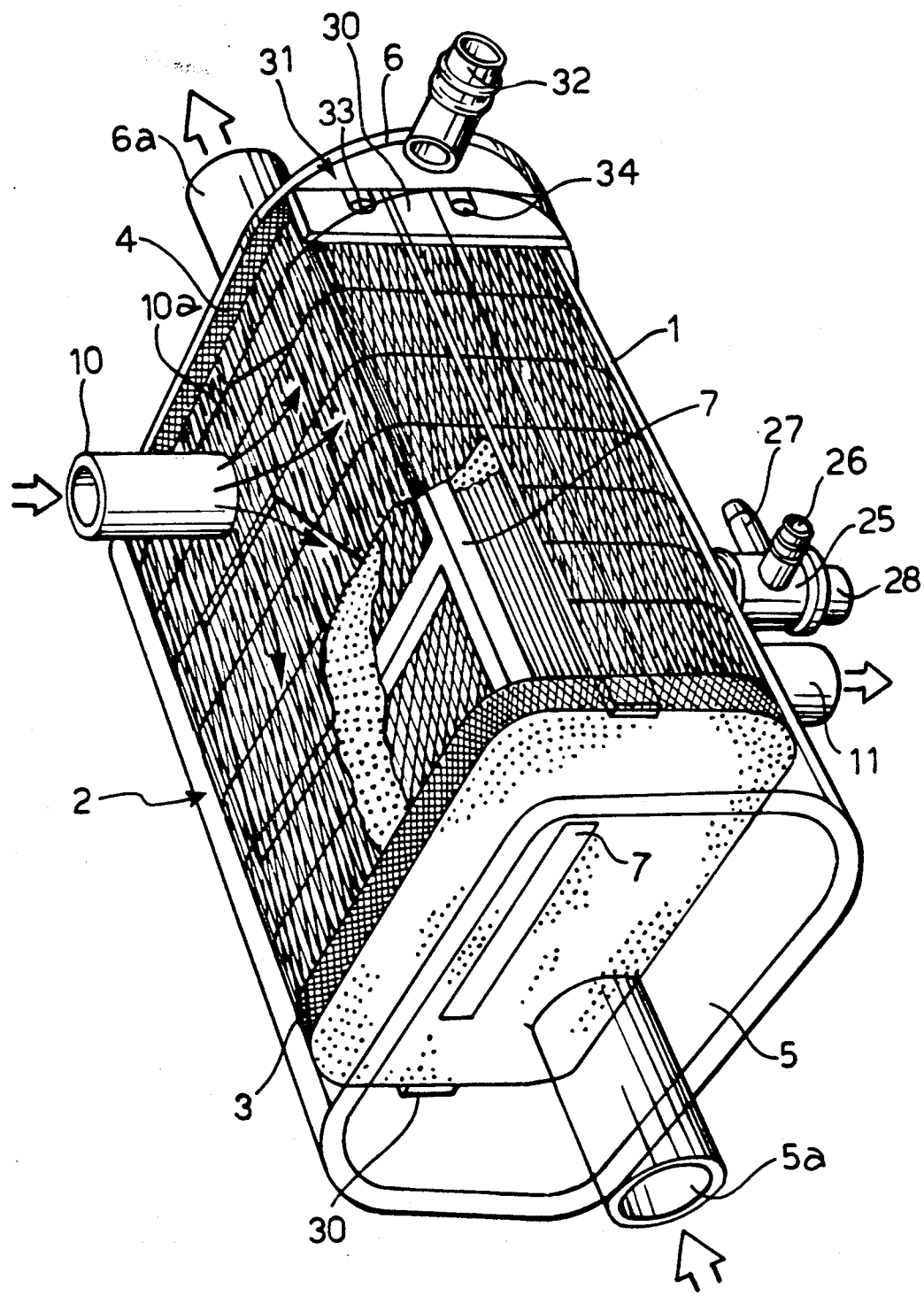
FIG. 1 is a transparent, cut-away perspective view of the invention according to a first embodiment.

The described arrangement of the hollow fibres in the various layers, which are formed so that their attitutdes correspond to that of the frame 7, provides good uniformity of resistance to the passage of the blood which enters through the connector 10, spreads throughout the chamber 10a adjacent the upper end layer of hollow fibres of the plurality 2, as shown by the arrows in FIG. 1, and passes through the plurality of layers in a direction substantially perpendicular thereto, so as to bathe the fibres externally without encountering any appreciable resistance due to the presence of the frame 7 which allows the maximum flow, the blood emerging into an outlet chamber adjacent the lower end layer which has an outlet connection 11. The uniform distribution of the blood flow, which in the device described bathes the hollow fibres without any occluded regions or preferred passages, enables pressure losses to be reduced to a minimum so that, in operation, the flow of blood can be achieved by gravity alone, with all the resulting advantages.

The hollow fibres in the plurality of layers 2 can convey oxygen, or a mixture of oxygen and nitrogen, and are made from a known type of a microporous, hydrophobic plastics material through which the oxygen flows towards the blood and the carbon dioxide flows from the blood in the opposite direction, by diffusion due to the differences in concentration, and, although the device oxygenates the blood in this case, the hollow fibres could just as well be made from an impermeable plastics material so as to convey water for exchanging heat with the blood in order to regulate its temperature, the device according to the invention thus being in the form of a heat exchanger.

In fact, it is particularly advantageous for oxygenators and heat exchangers formed by devices according to the invention to be coupled in series in an extracorporal circuit.

In the embodiment shown in FIG. 1, there is quite a large number of hollow fibres which, since they are in the parts of the bands 8 and 9 which are turned down around the frame 7, are not in the plurality of layers whose attitudes correspond to that of the frame. If this edge effect is to be reduced so that it is negligible, the embodiment shown in FIG. 3 must be adopted.

According to this embodiment, a casing 12 is again provided for housing a plurality of superposed layers, generally indicated 13, of hollow fibres whose ends are incorporated in potting 14, 15 and open into spaces 16 and 17 with respective connectors 16a, 17a for the inlet and outlet of the fluid which is to be conveyed by the hollow fibres, and it is again envisaged that the blood will enter through the connector 18, spread throughout the chamber 18a adjacent the upper end layer of hollow fibres, then pass through the various layers in a direction substantially perpendicular thereto, and emerge in an underlying outlet chamber provided with an outlet connector 19.

Unlike the first embodiment described, however, the layers of hollow fibres are combined in three adjacent blocks produced by the winding of pairs of bands, like 8 and 9, around respective frames 20, 21 and 22, all of which have the same conformation so as to ensure that the maximum flow of blood takes place in the directions of the arrows shown in the drawing.

In this embodiment, which also includes a structure made of thin elements 23 for keeping the layers of hollow fibres compact, the number of fibres which are not in flat layers parallel to the frames is obviously less than in the embodiment shown in FIG. 1.

The invention described may be modified and varied in many ways which all fall within the scope of the inventive concept: thus, for example, the various layers of hollow fibres could be formed without frames or there may be any desired number of frames if they are present.

In FIG. 1 (the same solution may also be used in the variant of FIG. 3) a further duct, generally indicated 25, extends from the wall of the casing 1 near the outlet connector 11 and is intended, when the device is in its normal position of use with the portions 5 and 6 superposed, to be situated at the lower end of the device.

Two connectors 26 and 27 branch from the duct 25 and can be made operative alternatively or can both be shut off by the rotation of a control tap 28.

The connector 26 has the function of enabling a certain arterialized blood-flow (that is, after the oxygen exchange) to be tapped off at any stage of the operation, even when it is not expressly anticipated.

It is thus possible, for example, to carry out so-called "coronary blood perfusion" by means of a tube connected to the connector 26 by a quick and secure coupling.

The connector 27 has a double function:
to enable an influx of filling liquid (blood, physiological solutions, etc. . .) from an overlying container (not illustrated) at the start of the stage of use of the device (priming) to prevent the formation and persistence of bubbles or air therein, and
in any case, to enable the blood to be recirculated through the device if necessary.

Two strips or similar elongate formations, indicated 30 (possibly constituted by ribs projecting from the walls of the device) are arranged along the sides of the pack of fibres 2 and have the function of theoretically dividing the space in which the blood flows outside the pack of fibres 2 into a portion facing the connector 10 for the inlet of the blood to be oxygenated, and a portion facing the connector 11 for the outlet of the oxygenated blood.

In the top part of the device there is a chamber 31 which communicates with the outside of the device through a connector 32 and is separated from the internal cavity in which the fibres 2 are situated by two non-return valves 33 and 34 situated on opposite sides of the strip 30 so as to face the blood-inlet portion and the blood-outlet portion, respectively.

The two valves act in concert to enable air and any bubbles to be vented from the device through the connector 32 during filling and during the operation of the device. The passage of non-oxygenated blood from the inlet portion to the outlet portion is thus prevented, whilst the two portions are discharged simultaneously.

What is claimed is:

1. A blood treating device comprising:
   (i) a housing within which blood flows for treatment by diffusion using porous hollow fibers located within the housing,
   (ii) fluid inlet means defining space and fluid outlet means defining space that are oppositely located along a longitudinal axis of said housing,
   (iii) a fluid inlet opening into the fluid inlet means defining space and a fluid outlet opening into the fluid outlet means defining space,
   (iv) an inlet and outlet chamber oppositely placed in said housing, each lateral of said fluid inlet and fluid outlet means defining spaces,
   (v) a blood inlet and a blood outlet connected to said housing, the blood inlet opening into the inlet chamber and the blood outlet opening into the outlet chamber,
   (vi) one or more frames, constructed and arranged to allow blood to pass therethrough, located in the housing between opposing walls thereof and between the chambers, with ends thereof facing the fluid inlet and fluid outlet means defining spaces, wherein a width and length of each frame is essentially equal to a width and length of each of the inlet and outlet chambers,
   (vii) bands of hollow fibers wrapped around each frame so that portions of the bands are located on the sides of each frame facing said inlet and outlet chambers and the opposing walls of the housing, and defining open ends at the ends of the frame facing the fluid inlet and fluid outlet means defining spaces, which bands comprise a plurality of superposed layers of hollow fibers wherein each alternating layer of the hollow fibers is inclined at a different angle relative to the longitudinal axis of the housing,
   (viii) fibers, at one end of the frame facing the fluid inlet means defining space, are openly connected to that space and fibers, at the other end of the frame facing the fluid outlet means defining space, are openly connected to that space, and
   (ix) a blood flow path from the inlet chamber, around and between fibers of the superposed layers of hollow fibers between the opposing walls and into the outlet chamber.

2. The blood treating device of claim 1 wherein the fibers are embedded in potting material at said fluid inlet and outlet means defining spaces.

3. The blood treating device of claim 1 wherein the housing contains one frame.

4. The blood treating device of claim 1 wherein the housing contains elements constructed and arranged for pressing against the plurality of hollow fiber layers to compact them.

5. The blood treating device of claim 1 wherein the outlet chamber contains a connector constructed and arranged for controlling arterialized blood flow after oxygen exchange.

6. The blood treating device of claim 1 wherein the outlet chamber contains a connector constructed and arranged for recirculating blood through the device.

7. The blood treating device of claim 1 wherein the outlet chamber contains a connector constructed and arranged for controlling bubbles during priming of the device.

8. The blood treating device of claim 1 wherein the housing contains strips that are connected to the opposing walls of the housing arranged along the fibers wrapped around the sides of each frame.

9. The blood treating device of claim 1 wherein the housing contains a valve constructed and arranged for venting air.

10. The blood treating device of claim 1 wherein the housing contains a valve constructed and arranged for venting air and strips that are connected to the opposing walls of the housing arranged along the fibers wrapped around the sides of each frame, the outlet chamber contains a connector constructed and arranged for recirculating blood through the device, a connector constructed and arranged for controlling bubbles during priming of the device and a connector constructed and arranged for controlling arterialized blood flow after oxygen exchange, the housing contains one frame and contains elements constructed and arranged for pressing against the plurality of hollow fiber layers to compact them, and the fibers are embedded in potting material at said fluid inlet and outlet defining spaces.

* * * * *